United States Patent [19]
Murray

[11] Patent Number: 5,404,521
[45] Date of Patent: Apr. 4, 1995

[54] OPPORTUNISTIC TASK THREADING IN A SHARED-MEMORY, MULTI-PROCESSOR COMPUTER SYSTEM

[75] Inventor: Kelly E. Murray, Belchertown, Mass.

[73] Assignee: Top Level Inc., Amherst, Mass.

[21] Appl. No.: 133,958

[22] Filed: Oct. 5, 1993

Related U.S. Application Data

[63] Continuation of Ser. No. 560,441, Jul. 31, 1990, abandoned.

[51] Int. Cl.⁶ .......................... G06F 9/40; G06F 15/16
[52] U.S. Cl. ..................................... 395/650; 395/375; 364/DIG. 1; 364/230.3; 364/230.4; 364/281.3; 364/281.8; 364/262.4; 364/263
[58] Field of Search ................................ 395/650, 375

[56] References Cited

U.S. PATENT DOCUMENTS

| | | | |
|---|---|---|---|
| 4,149,243 | 4/1979 | Wallis | 364/DIG. 1 |
| 4,800,521 | 1/1989 | Carter et al. | 364/DIG. 2 |
| 4,914,570 | 4/1990 | Peacock | 364/DIG. 1 |
| 4,954,945 | 9/1990 | Inoue | 364/DIG. 1 |
| 5,021,945 | 6/1991 | Morrison et al. | 364/DIG. 1 |
| 5,129,086 | 7/1992 | Coyle, Jr. et al. | 364/DIG. 1 |
| 5,159,686 | 10/1992 | Chastain et al. | 364/DIG. 1 |

*Primary Examiner*—Eddie P. Chan
*Attorney, Agent, or Firm*—Brooks & Kushman

[57] ABSTRACT

Method and apparatus are provided in a shared memory, multi-processor computer system for reducing the time required to run an application program on the processors of the system by reducing the overhead associated with the separation of the program and the initiation of the parallel execution of the tasks. The system has a plurality of processors wherein the application program is separated into different tasks and the tasks are executed in parallel on the processors of the system. The system further includes a process enabling the execution of either opportunistic or queued threads. In the preferred embodiment, the method includes the steps of (a) determining if one of the processors is free to execute a first task, and (b) performing the first task if step (a) determines that none of the processors are free. The method also includes the steps of (c) reserving the one processor for the first task if step (a) determines the one processor is free, and (d) constructing and transferring a task data structure for the first task to the reserved processor. Finally, the method includes the steps of (e) creating a future object for the first task, (f) performing the first task on the one processor, and (g) placing the results of step (f) in the future object. An alternative embodiment includes the ability to stack or queue threads onto a Global Queue to await execution by a free processor.

18 Claims, 5 Drawing Sheets

OPPORTUNISTIC TASK THREADING IN A SHARED-MEMORY, MULTI-PROCESSOR COMPUTER SYSTEM

This is a continuation of application Ser. No. 07/560,441, filed on Jul. 31, 1990, now abandoned.

TECHNICAL FIELD

The present invention is directed to shared memory, multi-processor computer systems designed to increase the execution speed of an application program by means of parallel processing.

BACKGROUND ART

Parallel processing systems of the prior art have generally fallen into one of three classes, the first being Single Instruction Multiple Data (SIMD), which can perform the same operation over each element of a data set in parallel, such as vector processors. This type of parallel processing system is appropriate only for limited and specific types of applications and requires specialized programming to utilize.

The second type of system is the Distributed-Memory Multiple Instruction Multiple Data ("MIMD"). These multicomputers have general purpose processors but do not share memory and communicate with each other through some alternative medium. This type of system is easy to construct and may include many processors and be programmed in existing languages, but it is difficult to operate because of a need for explicit and slow communication between processors, making programming difficult.

The third type of parallel processing system, Shared-Memory MIMD, can be programmed with existing languages, but it is more difficult to build because of related costs and is limited to a small number of processors. Its advantage is that it provides a closer model of computation to existing serial systems, making it easier to utilize.

Traditional parallelism used to solve a problem may be characterized by three common elements; identifying the problem to be solved, partitioning the problem into smaller pieces that can be performed in parallel, and combining the results of these pieces. Existing systems are required to spend time determining what activities to perform in parallel, insuring those activities have adequate resources, and then combining obtained results.

Previously, two alternatives were available to address these determinations. One approach required the programmer to specify all of the activities and is the method adopted in the fork-join construct. Alternatively, in some systems these activities are performed entirely by compilers, as when FORTRAN do-loops are automatically partitioned for parallel execution.

The second approach disclosed by Robert H. Halstead, Jr. of Massachusetts Institute of Technology, in his article in the October, 1985 issue of *ACM Transactions On Programming Languages And System*, entitled: *Multilisp: A Language for Concurrent Symbolic Computation* provides the more powerful and general construct of a "future". When a computation is created, it is represented by (referenced through) a future object. Until its computation has been completed, the future object is undetermined. When the computation is complete, the future object becomes the value returned by the computation. The future object, once determined, is indistinguishable from this value. The advantage of futures over forks is that futures eliminate the need for an explicit joint operation.

Future objects are affected by two types of operations. A strict operation forces the future computation of the object and will wait until the value becomes available before continuing with the computation. Strict operations involve looking at the actual data type or value of an object. Non-strict operations only reference a pointer to the object, therefore, any operations not requiring the specific value represented by the future are not required to wait for the actual value of the future before completing the computation.

Future objects, as they exist in prior art, are built on top of the LISP programming language and therefore require considerable overhead. Also, to operate presently, all computations must first be scanned for futures, which again requires much overhead. In addition, original systems that incorporated future constructs required in excess of sixty thousand (60,000) bytes to represent a future, whereas the present invention only requires eight (8) bytes. These factors contribute to the inefficiency of the prior system in terms of limiting parallel speedup.

To effectively use parallelism, the associated overhead must not be prohibitive. Overhead is viewed as a cost to the computer and defined as the time required for the mechanisms to break the application into individual tasks and to initiate the parallel execution of those tasks. Therefore, the minimization of overhead is paramount to successful use of the system.

Presently, parallel systems contain two levels of parallelism known as the light-weight process and the heavy-weight process. These two levels are in fact two operating system levels which have different rates of overhead and properties.

SUMMARY OF THE INVENTION

The present invention provides a solution to the above described problems of the prior art, and other problems by providing in a shared memory, multi-processor computer system a method for increasing the execution speed of an application program by means of parallel processing.

In the present embodiment, the system incorporates a technique that reduces the cost of spinning off a task by a significant factor in comparison with the prior art. These tasks are executed concurrently at the opportunistic thread level of parallelism. This procedure is referred to herein as Opportunistic Threading.

In a described embodiment of the invention, a main or master process operates in conjunction with a plurality of processor resources (needles) to direct or control the assignment and distribution of tasks to be performed. A Needle Allocation Record ("NAR") is used to coordinate tasks to be performed in parallel without necessitating the use of a queue and its corresponding locking system.

Once the NAR is reserved and the task is allocated to a processor resource, a future object is created, which allows the main process to continue as though the task were completed. Once the processor resource actually completes the task, the future object is replaced with the value of the computation.

Accordingly, it is an object of the present invention to provide unprecedented performance in terms of both the parallel speedup with regard to the execution time of an application and the ease of parallel programming.

It is another object of the present invention to eliminate the cost of packaging a task in situations where no processors/needles are available.

A further object of the present invention is to provide greater parallel speedup, especially in situations where the computations to be performed in parallel are numerous and short-lived.

An additional object of the present invention is to provide new levels of parallelism beyond the existing levels of light-weight and heavy-weight processes.

A further object of the present invention is to reduce the overhead of the threading mechanism and to simplify the task of parallel programming in general by eliminating the need to construct non-intuitive algorithms in order to exploit the benefits of parallel speedup.

Still another object of the present invention is to reconstruct the existing use of future objects to eliminate the need to type-check every argument to determine if a future object is contained within the computation.

An additional object of the present invention is to represent future objects at a lower level requiring the use of only eight (8) bytes rather than the prior use of sixty-four thousand (64,000) bytes.

A further object of the present invention is to rebuild the constructs in machine code for the operation and utilization of future objects to avoid the necessity of searching for future objects in every computation.

A specific object of the present invention is to avoid the necessity of stacking or queueing every task to be performed and the use of the related locking mechanism.

The above objects and other objects of the present invention are carried out in a shared memory, multiprocessor computer system having a plurality of processors (a main processor and parallel processors) wherein an application program is separated into different tasks which are executed in parallel by the system's processors. The time required to run the application program on the processors of the system is decreased by reducing the overhead associated with the separation of the program and the initiation of the parallel execution of the tasks. First it is determined if one of the parallel processors is free to execute a first task. If not, the first task is performed on the main parallel processor. If one of the processors is free, it is reserved to perform the necessary task. Next, a task data structure for the first task is constructed and transferred to the reserved processor. A future object is created for the first task. The first task is then performed on the reserved processor and the results are placed in the future object.

Further in carrying out the above objects and other objects of the present invention, apparatus is provided for carrying out the method steps above.

The above objects and other objects, features and advantages of the present invention are readily apparent to those skilled in the art from the following detailed description of the best mode for carrying out the invention when taken in connection with the accompanying drawings.

BEST MODE FOR CARRYING OUT THE INVENTION

For purposes of this application, there are three levels of parallelism known collectively as grains or granules, each having different properties and incurring different amounts of overhead. The three levels are the Process, Task and Thread.

The Thread is the finest level (grain-size) of parallelism. It is intended to be a computation that will be performed quickly, and thus any time spent dealing with it should be as small as possible. Threads consist only of a function and its arguments and do not have a control or binding stack of their own. Traditionally, all threads have been queued or stacked. Such threads are first placed on a stack where they await execution or computation. This approach requires additional operations to be performed prior to execution resulting in unwanted and unnecessary overhead. Specifically, to perform a computation or task, it was necessary for all free (non-busy) microprocessors to search the stack and compete for each task. Time spent searching and competing for a task, in addition to the requirement of including operational information with each task, adds costly overhead to the run time. The addition of this machine information is referred to as "packaging" the task to be performed.

The Task and the Process levels are respectively, the medium grain and the large grain form of parallelism. These two levels of parallelism are not the focus of the present invention and consequently do not require further discussion.

Figures 5A, 5B:
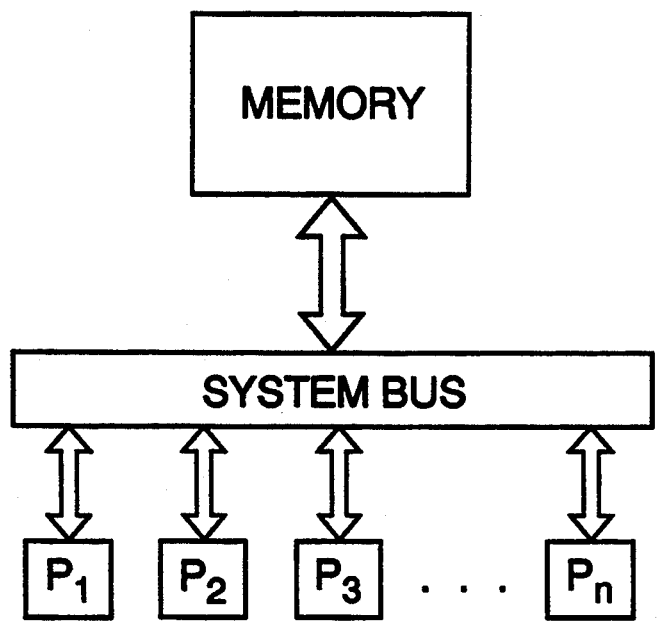
FIG. 5a is a basic block diagram of a shared memory, multi-processor computer system.
FIG. 5b is a diagrammatic representation of a Needle Allocation Record (NAR) according to the present invention.

The present invention provides all of the known benefits of a MIMD parallel processing system illustrated in FIG. 5a, using future objects and threads with minimal overhead, to increase the efficiency and speed of parallelism and increase its applicability for general use.

Figure 1:
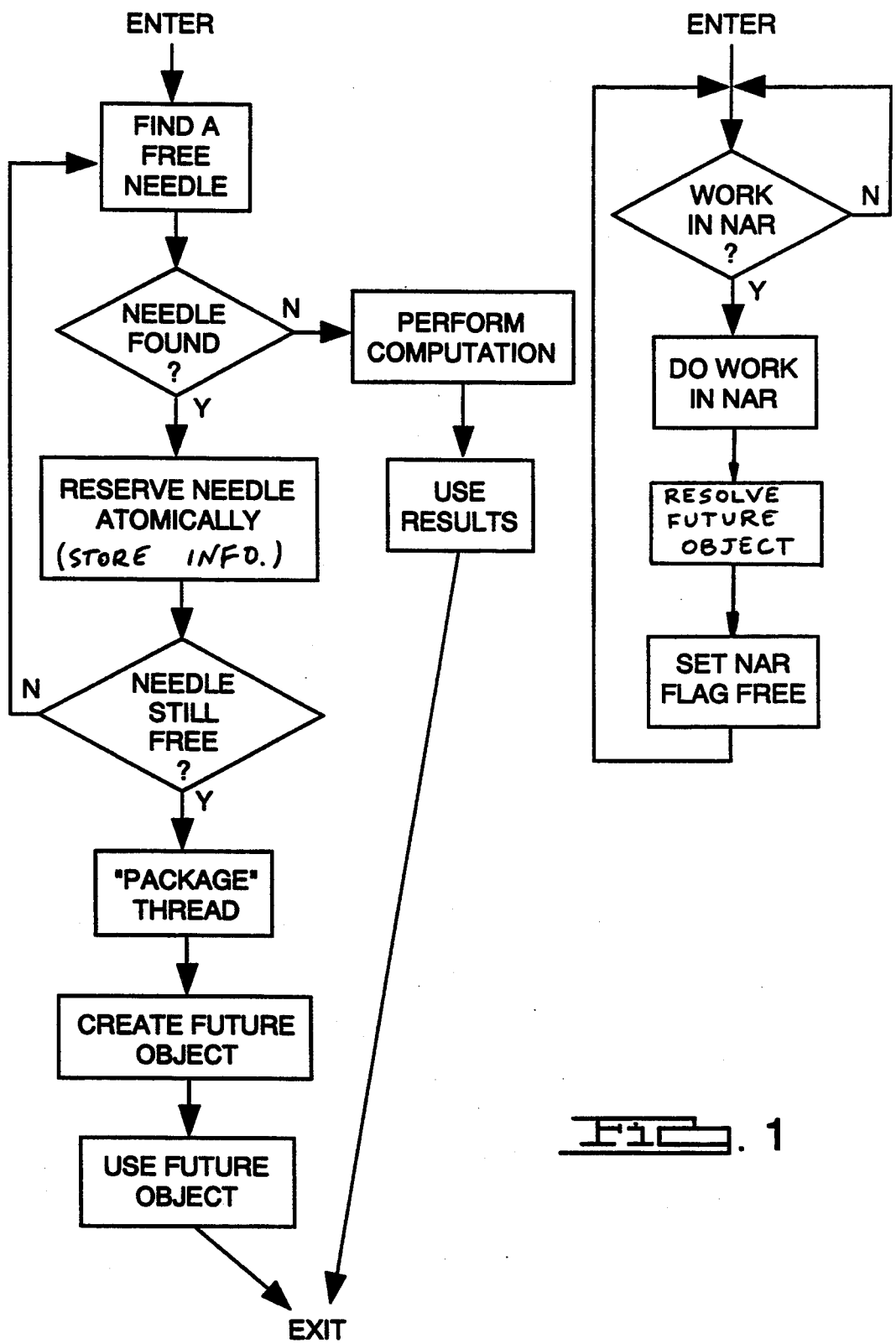
FIG. 1 is a diagrammatic representation of a system incorporating opportunistic threading.

The embodiment of the invention illustrated in FIG. 1 is a diagrammatic representation of a system containing two components for the efficient use of parallelism at the Opportunistic Thread level of parallelism.

The first component is Opportunistic Threading, a mechanism for spinning off tasks to be performed in parallel. The second is one of a set of needle processes to be executed by the needles that perform the task computations in parallel. The tasks that are spun off at the Opportunistic Thread level of parallelism are hereinafter referred to as "threads" and the physical processors that are available to execute the threads in parallel are hereinafter referred to as "needles."

The Opportunistic Threading mechanism is represented in FIG. 1. Given a thread to be executed in parallel, the following steps are performed:

First, a free needle is found to execute the thread. A data structure, which will be referred to as the Needle Allocation Record, or NAR, contains a slot for each needle, best illustrated in FIG. 5b. Each slot contains information regarding whether or not the corresponding needle is busy, in which case the needle is not available to compute the thread in parallel, or whether the needle is free, in which case the needle can begin concurrent execution of the thread.

If no needles are available, the main processor will perform the computation associated with the thread immediately and use the results of the computation. It is important to note that if no needles are available, no locking is required (i.e. "Lock-Free").

If a needle is available, its use is reserved by atomically marking its slot in the data structure "as busy." By marking an available needle's slot as busy, a process is effectively claiming the rights to use the needle as a resource. In situations where multiple processes executing concurrently are all trying to spin off additional threads to be performed in parallel, it is critical that only one of the executing threads be allocated the resource of the free needle. If multiple threads are allocated the same free needle, an error fatal to the application's execution will result (i.e., it is impossible for a single needle to execute multiple threads at once).

In a multi-processor system, locking is used to preserve data integrity by preventing multiple processes from trying to alter the contents of a memory location simultaneously. As an example of the need for locking, consider a situation where two processes read the NAR slot for a needle and see that it is free. Both then proceed to assign the needle a thread to compute in parallel. However, only one of the processes will be successful in its attempt to allocate work to the needle. Unfortunately, both processes will think they were successful and will proceed accordingly. As a result, one of the threads will never be executed and any process waiting for the results of that thread will terminate with a fatal error.

By marking a needle's slot as busy with an atomic operation, a hardware locking mechanism prevents other processes from marking the same slot at the same time. This guarantees that if multiple processes are vying for the same needle resource, only one process will get it (i.e., multiple processes may execute atomic attempts to secure a resource by marking the resource's slot as busy, but only one will succeed and the others will find the resource already marked as busy.)

If the atomic reservation was unsuccessful, the first step is returned to. Since multiple processes might be executing the atomic reservation simultaneously, a given process must verify that it has been allocated the resource. For example, the process might see that a needle was free, then try to reserve its use. However, a second process might have been reserving the needle's use at the same time the first process was checking to see that the needle was free. Thus, a process checks the result of the atomic reservation to insure that it has the use of the needle. If it does not, then it starts the sequence over.

If the atomic reservation was successful, the next step is to "package" the thread for later execution by a needle. Packaging the thread involves constructing a data structure that includes the name of the thread function and its arguments. This data structure is then passed to the needle responsible for the thread's concurrent execution.

Future Objects are the constructs used to implement parallelism in programming the system. After packaging, a future object is created to allow the system to continue with the computation. The future object is then used to represent the value of the thread's computation until the actual value is computed.

The second component, also shown in FIG. 1, is a "needle resource" that is initialized by the system prior to the start of an application program's execution or dynamically, by the application program itself. The needle process first checks the needle slot in the NAR to see that it has been allocated to a thread. If it has, it immediately executes the thread. If the needle has not been allocated a thread, it loops back to the previous step and checks again. After the needle finishes executing the thread, it resolves the corresponding future object to the value of the thread's computation and it sets its NAR flag to "free".

In an alternative embodiment of the present invention, queued threading is used. Queued Threading is similar to Opportunistic Threading in that some number of processor resources are initialized before the execution of an application program is begun. Then, as tasks become available for concurrent computation, they are distributed to the processor resources via queue data structures.

Figure 2:
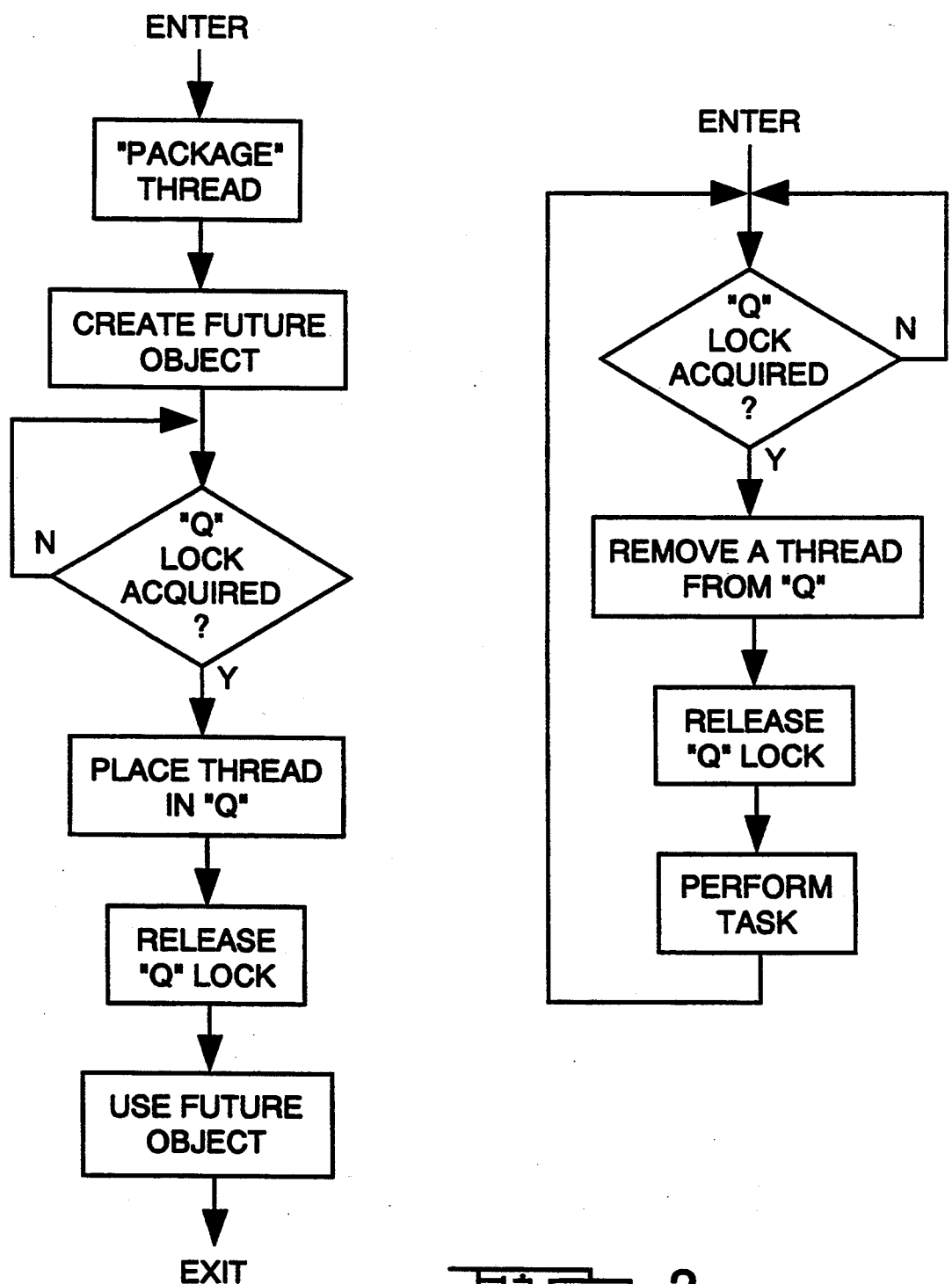
FIG. 2 is a diagrammatic representation of a system incorporating queued threading.

Queued Threading is represented in FIG. 2. A process attempting to spin off a thread to be performed in parallel relies on the following steps: First, the process packages a thread and creates a future object. Then the lock for the Thread Queue is obtained allowing the thread to be put on the Thread Queue. The lock for the Thread Queue is then released. The process utilizes this future object to complete the computation without being required to wait for its actual value.

The processor resources, also represented in FIG. 2, perform the following steps: obtain the lock for the Thread Queue to remove a task from the Thread Queue; remove the task from the Thread Queue; and release the lock for the Thread Queue to execute the task. Then, the process returns to the first step.

Figure 3:
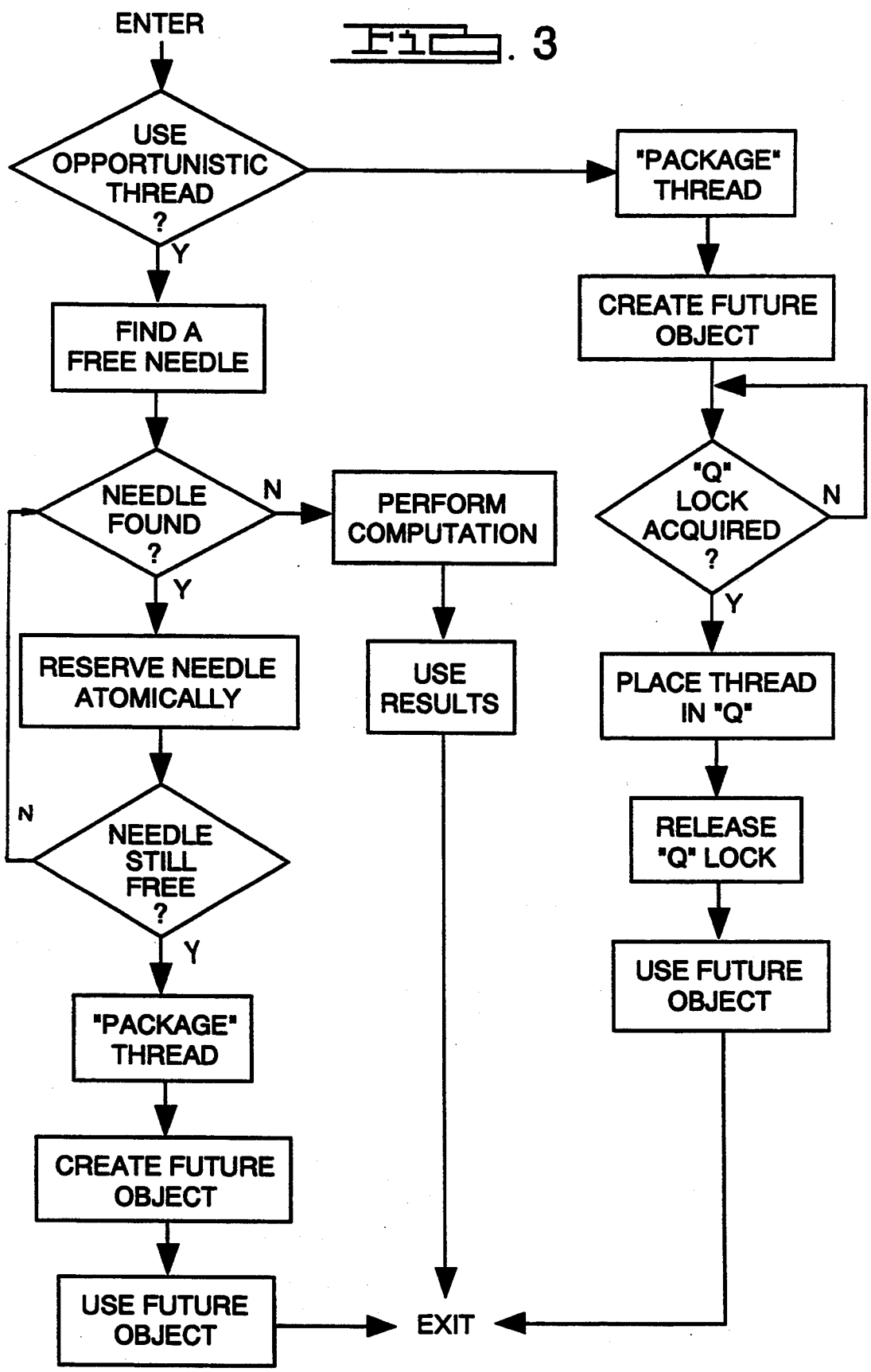
FIG. 3 is a diagrammatic representation of an alternative embodiment of the present invention using both opportunistic and queued threading.

The embodiment represented in FIG. 3 combines elements of both FIGS. 1 and 2 such that the system is capable of performing both opportunistic and queued threading simultaneously. The combined opportunistic/queued mechanism for spinning off tasks to be computed in parallel operates according to the previously described steps in FIGS. 1 and 2.

To combine these two systems, it is first necessary to introduce a decision step diagrammatically symbolized in the decision box which reads "Use Opportunistic Threading?". This step determines whether or not to use opportunistic threading and proceeds accordingly. This step can be user specified or a function can be constructed to perform this step automatically. If it is determined that opportunistic threading will be used, the steps described in FIG. 1 will be performed or, if it is determined that queued threading should be used, the steps shown in FIG. 2 will be followed.

Figure 4:
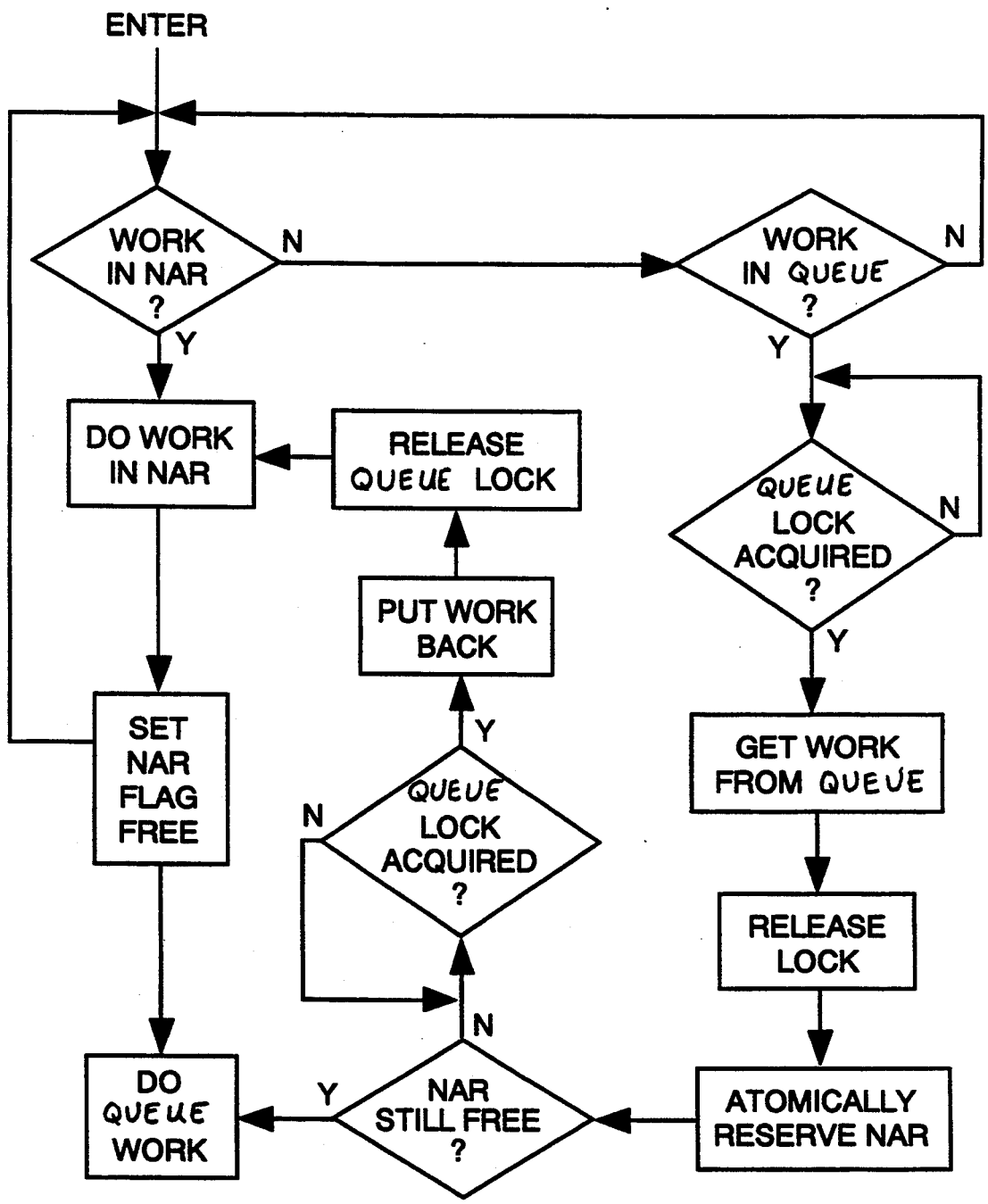
FIG. 4 is a diagrammatic representation of the combined needle process used to allow execution of both the opportunistic and queued threading.

The significance of the embodiment shown in FIG. 4 is such that it enables the combination and flexibility as well as inherent benefits of both the opportunistic and queued threading.

FIG. 4 illustrates the combined needle process for executing either opportunistic or queued threads. This combined needle process is necessary in order to properly execute the combined opportunistic/queued threading process depicted in FIG. 3.

The combined needle process operates in the following manner: First, it is necessary to check that there is work in the NAR. If yes, the work is performed and the corresponding future object must be resolved once the computation is completed. Upon completion of the computation, the NAR flag is set to the "free" setting and the process returns to step 1. If there is no work to be performed in the NAR, a check is made of the thread queue for work. If there is work to perform in the queue, it is necessary to obtain the lock for the thread queue. If the lock is occupied, it is necessary to loop until the lock becomes available. Once the lock is obtained, the lock is used to remove a thread from the thread queue. After a thread is removed from the queue, the lock is released. Prior to performing the task, it is necessary to atomically reserve the NAR.

At this stage, an internal safety check is conducted to assure that only one task/thread is allocated to each needle. This safety check is conducted by looking to see if the needle was allocated an opportunistic thread while it was in the process of removing a task from the queue. If the needle was allocated a task from the opportunistic thread, then the needle must obtain the lock for the queue (looping until it is available), then put the queued thread back on the queue and release the lock. Next, the needle will perform the work specified in the NAR. If the needle was not allocated an opportunistic thread, the needle will perform the work obtained from the queue, and resolve the corresponding future object with the value of the computation once complete. The last step is to return the needle's flag in the NAR to "free".

The most significant differences between Queued Threading and Opportunistic Threading is the use of locks and queue data structures. Opportunistic Threading does not use a queue to store potential work. Instead, Opportunistic Threading only allocates work to a needle if the needle is free. Otherwise, the work is performed immediately. Consequently, it is not necessary to store any potential work-to-be-performed and the corresponding steps (in particular locking) associated with protecting the integrity of such data structures are eliminated.

As a result of eliminating the costly locking steps, Opportunistic Threading has a much lower overhead cost than Queued Threading.

While the best mode for carrying out the invention has been described in detail, those familiar with the art to which this invention relates will recognize various alternative designs and embodiments for practicing the invention as defined by the following claims.

What is claimed is:

1. A method for parallel processing implemented by a computer having a plurality of processors including a main processor for executing a main process and at least one parallel needle processor for executing threads initiated by the main process, the computer also having a memory shared by the plurality of processors, wherein the execution time of the main process is reduced by decreasing the overhead associated with separation from the main process of a plurality of separable threads which are executed in parallel by the plurality of processors when available, the method comprising:

(a) determining, by the main processor, if said at least one parallel needle processor is available to execute a first thread;

(b) reserving, by the main processor, the exclusive right to use the parallel needle processor responsive to the parallel needle processor being determined to be available, and executing the first thread on the main processor responsive to the parallel needle processor not being available;

(c) constructing a packaging data structure including the first thread, by the main processor, and transferring the packaging data structure for execution on the reserved needle processor responsive to the reservation being successful;

(d) creating, by the main processor, a future object in the main process while the first thread is being executed on the reserved needle processor so as to allow the main process to continue execution prior to obtaining the result;

(e) utilizing, by the main processor, the future object in the main process as if the future object were the result of the execution of the first thread;

(f) returning a result of the execution of the first thread to the memory so as to resolve the future object.

2. The method of claim 1 wherein the shared memory contains a first data structure for indicating the status of the at least one needle, and wherein step (a) comprises examining, by the computer, the first data structure so as to determine if a parallel needle is available.

3. The method of claim 2 wherein said step (b) comprises reserving the parallel needle processor by modifying the first data structure utilizing a single machine instruction.

4. The method of claim 3 further comprising:
initializing, by the main processor, a needle process on the reserved parallel needle processor;
executing, by the needle process, a thread which has been allocated to the reserved parallel needle processor as indicated by the first data structure, so as to determine a result for the future object; and
modifying, by the main processor, the first data structure utilizing a single machine instruction so as to indicate the reserved parallel needle processor is available to execute another thread.

5. The method of claim 4 wherein the needle process is initialized prior to the start of the main process.

6. The method of claim 3 further comprising:
performing said step (c) only if the reserved parallel needle processor has been reserved for the first thread and not for a different thread; and
returning to said step (a) if the reserved parallel needle processor has not been reserved for the first thread.

7. The method of claim 1 wherein the step of packaging comprises constructing, by the computer, a second data structure in the shared memory that includes at least a name for the first thread and at least one argument to be operated on by the first thread.

8. The method of claim 7 wherein constructing the second data structure comprises occupying only eight bytes of the shared memory.

9. The method of claim 1 wherein the shared memory includes a queued threading process and an opportunistic threading process, the method further comprising:
determining, by the main processor, whether to execute the opportunistic threading process prior to determining if a parallel needle processor is available; and
performing said step (a) if the above step determines that the opportunistic threading process should be performed.

10. A method for parallel processing implemented by a computer having a plurality of processors including a main processor for executing a main process and at least one parallel needle processor for executing threads initiated by the main process, the computer also having a memory shared by the plurality of processors including a portion designated as a thread queue, wherein the execution time of the main process is reduced by decreasing the overhead associated with separation from the main process of a plurality of separable threads which are executed in parallel by the plurality of processors, the method comprising:

(a) constructing a packaging data structure including a first thread, by the main processor, for execution on a parallel needle processor;

(b) creating, by the main processor, a future object in the main process for the result while the first thread is being executed so as to allow the main process to continue execution prior to obtaining the result;

(c) obtaining, by the main processor, a lock for the thread queue so as to prevent modification of the thread queue by a competing process;

(d) placing, by the main processor, the first thread in the thread queue;

(e) releasing, by the main processor, the lock for the thread queue so as to allow modification of the thread queue;

(f) utilizing, by the main processor, the future object in the main process as if the future object were the result of the thread execution;

(g) initializing, by the main processor, a needle process on the parallel needle processor;

(h) obtaining, by the main processor, the lock for the thread queue so as to prevent modification of the thread queue by a competing process;

(i) removing, by the main processor, the first thread from the thread queue;

(j) releasing, by the main processor, the lock for the thread queue so as to allow modification of the thread queue; and (k) executing, by the needle process, the removed first thread so as to determine and return the result for resolving the future object.

11. The method of claim 10 wherein releasing the lock comprises a single machine instruction.

12. The method of claim 10 further comprising repeating the steps (g) through (k) until no threads remain in the thread queue.

13. The method of claim 10 wherein the shared memory further includes a queued threading process and an opportunistic threading process, the method further comprising:
determining, by the main processor, whether to execute the opportunistic threading process before performing said step (a); and
proceeding, by the main processor, with said step (a) only if the above step determines the opportunistic threading process should be executed.

14. Apparatus for parallel processing implemented by a computer having a plurality of processors including a main processor for executing a main process and at least one parallel needle processor for executing threads initiated by the main process, the computer also having a memory shared by the plurality of processors, wherein the execution time of the main process is reduced by decreasing the overhead associated with separation from the main process a plurality of separable threads which are executed in parallel by the plurality of processors when available, the apparatus comprising:
means for determining if a parallel needle processor is available to execute a first thread;
means for reserving an exclusive right to use the at least one parallel needle processor if the at least one parallel needle processor is determined to be available, and means for executing the first thread on the main processor if the at least one parallel needle processor is determined to be unavailable;
means for creating a packaging data structure including the first thread for execution on the reserved parallel needle processor responsive to the reservation being successful;
means for transferring the packaging data structure to the reserved parallel needle processor;
means for creating a future object in the main process while the first thread is being executed on the reserved parallel needle processor so as to allow the main process to continue execution prior to obtaining a result for the future object; and
means for utilizing the future object in the main process as if the future object were the result of the execution of the first thread means for returning a result of the execution of the first thread to the memory so as to resolve the future object; and 15. The apparatus of claim 14 wherein the shared memory contains a first data structure for indicating the status of the at least one needle processor and the means for determining comprises means for examining the first data structure so as to determine if a parallel needle processor is available.

16. The apparatus of claim 14 wherein the means for reserving comprises means for modifying the first data structure utilizing a single machine instruction.

17. The apparatus of claim 16 further comprising:
means for initializing a needle process on the reserved parallel needle processor;
means for executing a thread which has been allocated to the reserved parallel needle processor as indicated by the first data structure, so as to determine the result of the future object; and
means for modifying the first data structure utilizing a single machine instruction so as to indicate the reserved parallel needle processor is available to execute another thread.

18. The apparatus of claim 17 wherein the means for initializing is operative to initialize the needle process prior to the start of the main process.

* * * * *